May 28, 1940.   F. A. PARSONS   2,202,263
MACHINE TOOL TRANSMISSION AND CONTROL
Filed Dec. 18, 1936   5 Sheets-Sheet 3

INVENTOR
Fred A. Parsons
BY
ATTORNEY

May 28, 1940.   F. A. PARSONS   2,202,263
MACHINE TOOL TRANSMISSION AND CONTROL
Filed Dec. 18, 1936   5 Sheets-Sheet 4

INVENTOR
Fred G. Parsons
BY
ATTORNEY

May 28, 1940.   F. A. PARSONS   2,202,263
MACHINE TOOL TRANSMISSION AND CONTROL
Filed Dec. 18, 1936   5 Sheets-Sheet 5

Fig. 9.

INVENTOR
Fred A. Parsons
BY
ATTORNEY

Patented May 28, 1940

2,202,263

UNITED STATES PATENT OFFICE 2,202,263

MACHINE TOOL TRANSMISSION AND CONTROL

Fred A. Parsons, Milwaukee, Wis., assignor to The Falk Corporation, Milwaukee, Wis., a corporation of Wisconsin Application December 18, 1936, Serial No. 116,469

29 Claims. (Cl. 90—48)

This invention relates to transmission and control mechanism, and more particularly for machine tools.

An object of the invention is to provide an improved transmission mechanism, adjustable to effect any speed within a predetermined range, and particularly to effect such result in a manner to avoid variations in the ratio of input and output speeds, at a given speed adjustment, under different conditions of use, such as have been previously generally characteristic of friction or fluid operated rate changers by reason of slip or leakage, and especially to provide such transmission mechanism in a form suited for use in machine tools.

A further purpose is to provide an improved transmission in which rate changes are controlled by adjustment of engaged friction means in a manner such that changes in loading or other changes in operating conditions will not operate to cause variation in the rate selected, and particularly to provide such a rate changer in a form adapted for use in machine tools.

A further purpose is to provide an improved control mechanism in a form suited for the control of transmission mechanism such as previously mentioned, and especially for effecting a combined transmission and control mechanism adapted for machine tool use.

A further purpose is to provide transmission or control mechanism including some of the improvements previously mentioned and in a form to be particularly adapted for transmissions involving heavy pressure or torque, as for instance to effect a positive drive for the cutting train of a machine tool.

Another purpose is to provide improved transmission reversing mechanism and control mechanism therefor and more especially where the transmission is driven from an electric motor, and particularly for machine tool transmissions.

An other purpose is to provide an improved combination of rate changer and reversing mechanism together with control mechanism such, for instance, that the start of a cycle of movement will be at a preferred rate, and the rate will subsequently be automatically changed to effect a rate preferred for the other portions of the movement.

Another purpose is to provide improved transmission and control mechanism for change of rate during reversal, together with improved means for effecting a gradual change from the one to another rate during a time period of selected duration.

A further purpose is to provide such mechanism for change of rate together with improved means for effecting the desired change at selected points in a cycle of movement, as for instance at either or both of the reversing points at opposite ends of a reciprocatory cycle of movement.

Another purpose is generally to simplify and improve the construction and operation of transmission and control mechanism, particularly for machine tools, and more especially of planers, and still other purposes will be apparent from the specification.

The invention consists of the construction and combination of parts as herein illustrated, described and claimed, and in such modifications of the structure illustrated and described as may be equivalent to the structure of the claims.

The same reference characters refer to the same parts throughout, and in the drawings.

Figures 1, 11:
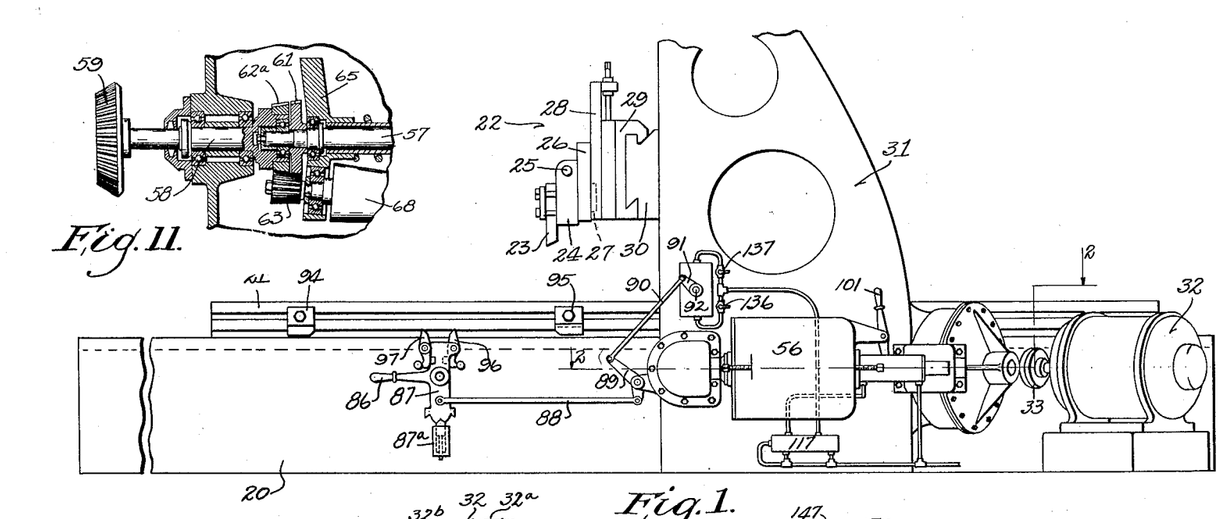
Figure 1 is a side elevation of a machine which incorporates the invention, the machine in this instance being a planer.
Figure 11 shows a modified portion of the rate changer shown in Fig. 3, in reduced size.

The machine here used to illustrate the invention is a machine tool of the type known as a planer, which includes a bed or base 20 which supports a work table or support 21 for reciprocation to right and left in Fig. 1.

Adjacent table 21 there is a tool support generally denoted by the numeral 22, which carries a tool 23 for adjustment relative to the table. In this instance the tool is carried on a clapper 24 for pivoting about a pivot 25 for relief of the tool during one direction of table movement, the clapper being carried by a support 26 for angular setting about a pivot 27, the support 28 being carried on slide 28 vertically adjustable on a saddle 29 which is horizontally adjustable above table 21 on a rail 30. Rail 30 is vertically slidably adjustable on supports, such as 31, 31, which are fixed with bed 20 at their lower end and extend upwardly respectively adjacent the opposite longitudinal edges of table 21.

The guide or slide means for the various supports, as well as means for adjusting and for rigidly fixing certain of the support members in adjusted position, being well known in various forms for a machine such as here shown is not here shown or described in detail, and it will be understood, may take a variety of forms.

For the movement of table 21 there is provided a power source, in this instance an electric motor 32, which is connected to drive the table through a transmission including the motor shaft 32a, a coupler 33 of any suitable form, a shaft 34, pinion 35, gear 36, shaft 37, a differential device generally denoted by the numeral 38, a shaft 39 co-axial with shaft 37, and a worm 40 engaging a suitable rack 41 which is fixed to the underside of table 21 to extend substantially the full length thereof between the table slides or guides 42, 43.

The differential device 38 includes, in this instance a bevel gear 44 fixed on shaft 37, a bevel gear 45 fixed on shaft 39, a cage or carrier member 46 which is independently rotatable co-axially with shafts 37, 39, and bevel gears 47, 48 each independently rotatably carried by cage 46 and each simultaneously engaging gears 44, 45. Fixed with cage 46 there is a worm wheel 49, which is engaged by a worm 50, Fig. 8, fixed on a shaft 51.

Figures 2, 7, 8:
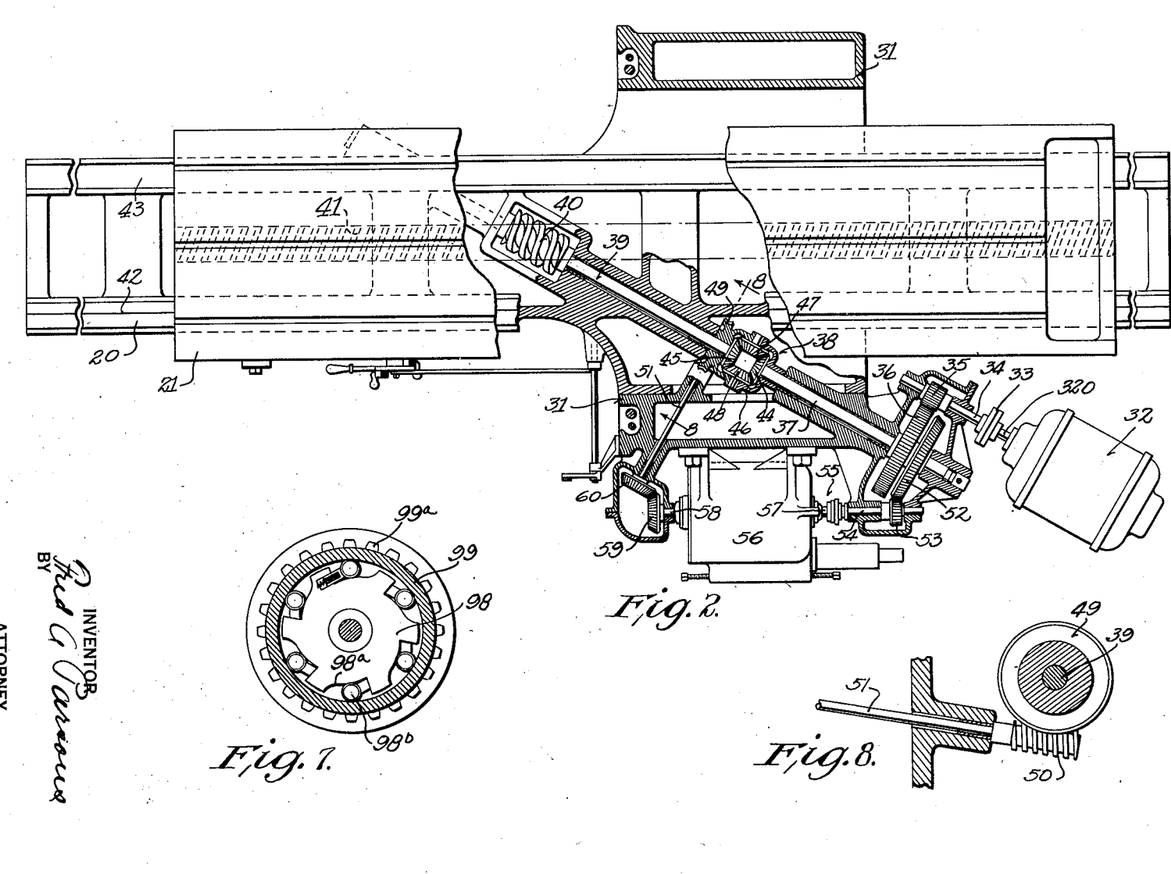
Figure 2 is a top or plan view of the same machine, partly in horizontal section taken approximately along the line 2—2 of Fig. 1.
Figure 7 is a vertical section taken along line 7—7 of Fig. 3, and enlarged.
Figure 8 is a partial vertical section taken along line 8—8 of Fig. 2, and enlarged.

The cage 46 of the differential 38 is connected from motor 32 through a transmission which includes a bevel gear 52 fixed on shaft 37, a pinion 53, a shaft 54, a clutch device generally denoted by the numeral 55, a speed control or rate changer unit generally denoted by the numeral 56, having a driving shaft 57 and a variable speed driven shaft 58, and bevel gears 59, 60, the last mentioned gear being fixed on the shaft 51 to drive the cage 46 through the worm 50, Fig. 8, and wheel 49.

The speed control or rate changer unit 56, as here shown, is of a construction disclosed in the co-pending application Serial No. 52,095, filed November 29, 1935, and will therefore here be only briefly described. The rate changer includes the drive shaft 57, a driving gear 61 fixed on the drive shaft, a driven gear 62 fixed on the driven shaft 58, which is co-axial with shaft 57, and gears such as 63 fixed on shafts such as 64, there being several of the gears 63, preferably three, equi-angularly spaced and each simultaneously engaging the driving gear 61 and driven gear 62. Shafts 64 are each journaled in a cage, generally denoted by the numeral 65, which is supported for independent rotation co-axial with drive shaft 57, the cage including a sleeve portion 65a and flange portions 65b and 65c fixed with sleeve 65 and respectively carrying the bearings for the opposite ends of shafts 64, in this instance anti-friction bearings such as 66, 67.

Fixed for rotation or integral with each of shafts 64 are conically tapered friction rolls such as 68, the axis of the shafts 64 being angularly disposed with respect to the axis of drive shaft 57, at an angle such that the outer periphery of each of the conical rolls is parallel with the axis of drive shaft 57. Frictionally simultaneously engaging the peripheries of each of the rolls 68 there is a non-rotatable friction ring 69 carried by a frame generally denoted by the numeral 70, the frame together with the ring 69 being adjustable in a path parallel with the axis of drive shaft, whereby to engage ring 69 with the rolls 68 at points of different roll diameter, the frame being slidably guided for such movement on spaced guide members or rods 71, 72, to be shifted by means later described. Ring 69 is prevented from rotation and carried by frame 70 in a manner permitting of a certain amount of adjustment relative to the frame whereby to simultaneously engage the periphery of each of the friction rolls 68 with equal pressure and at corresponding roll diameters, but since the details of the ring mounting do not concern the present invention they will not be here described.

Figure 3:
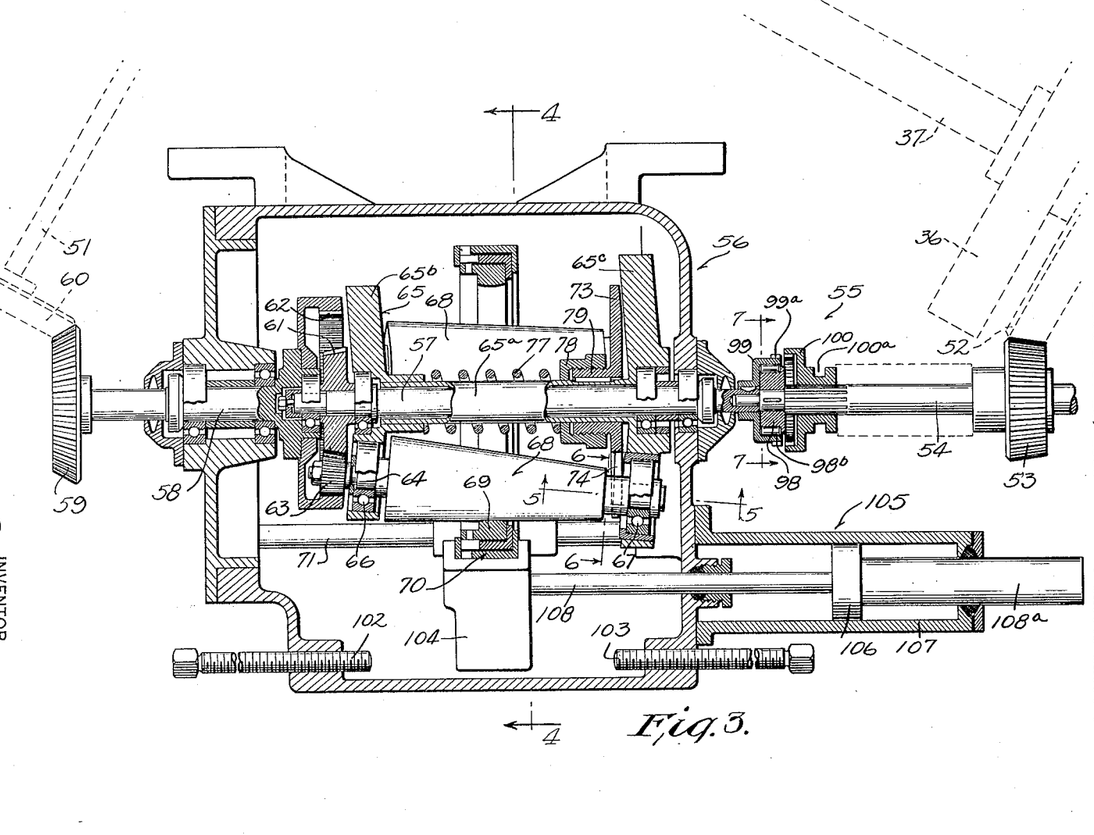
Figure 3 is an enlarged horizontal section through a speed control or rate changer unit shown in Figs. 1, 2, the section being taken along line 2—2 of Fig. 1.
Figure 4:
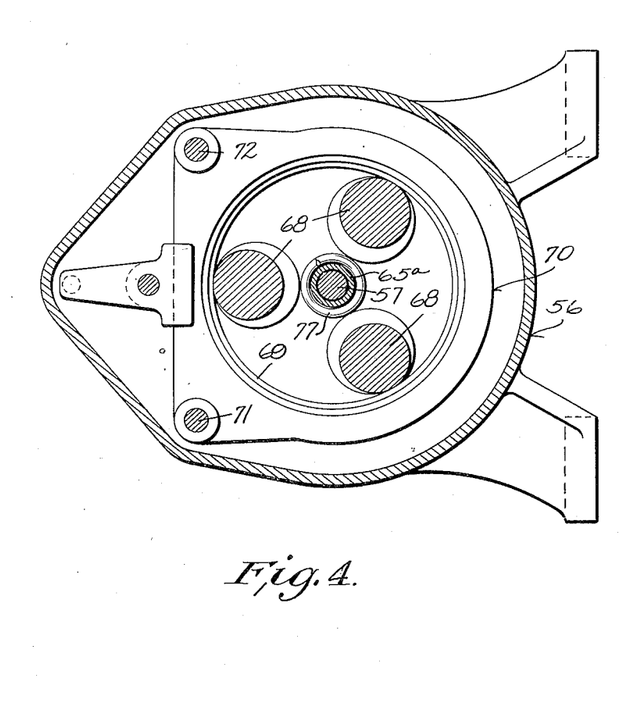
Figure 4 is a vertical section through the unit shown in Fig. 3, taken along line 4—4 of Fig. 3.

The friction contact between the rolls 68 and ring 69 forces each roll and its companion gear 63 to revolve whenever cage 65 is revolved and at a roll speed determined in part by the diameter of rolls 68 at the point of ring contact. As the ring 69 is axially shifted it contacts rolls 68 at points of different roll diameter and changes the relative speed of the rolls. Thus as the ring is adjusted to the right in Fig. 3 the speed of rolls 68 and of the gears 63 increases, and vice versa, and the relationship of the various parts of the rate changer is such that when shaft 57 is driven at a constant speed the variable speed of rolls 68 will enforce a variable speed on driven shaft 58. With the parts proportioned as shown in Fig. 3 the speed of driven shaft 58 may be any speed from zero speed, obtained when ring 69 is nearly in its farthest position to the right, to a maximum speed which is somewhat less than the speed of drive shaft 57, depending on the ratio of the gearing between shafts 57, 58, the ratio of the smallest and largest diameters of rolls 68, etc., but by suitably proportioning the parts the shaft 58 may pass through the zero speed and be driven reversely in the right hand position of ring 69. But in any event any speed within the range determined by the proportioning of the parts of the rate changer, either forward or reverse, may be obtained by adjustments of ring 69 to intermediate positions.

Figure 5:
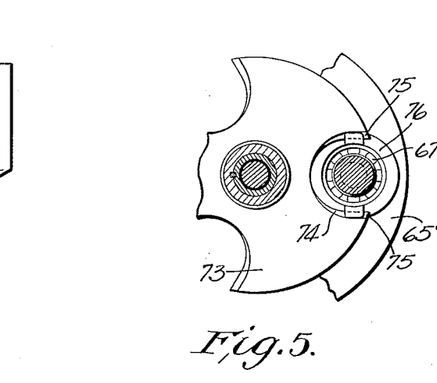
Figures 5 and 6 are partial vertical sections through the same unit taken respectively along lines 5—5 and 6—6 of Fig. 3.
Figure 6:
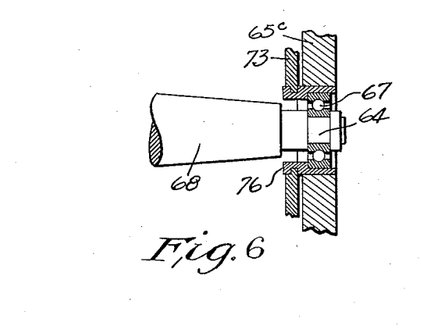

Means are provided to maintain suitable friction pressure between the rolls 68 and ring 69. For this purpose the bearings 66, 67 are mounted to be unitarily axially slidable along their axes with rolls 68. Each of the rolls is continuously urged to the right in Fig. 3 by the means of a yoke 73 slotted as at 74, Fig. 5, to provide ears such as 75 engaging a sleeve, such as 76, which carries the bearings 67, the yoke 73 being continuously urged to the right in Fig. 3, together with the sleeves, bearings and rolls, by the means of a spring 77, the spring pressure being adjustable by the means of a spring abutment member 78 threaded on the hub 79 of yoke 73. Forcing the rolls 68 to the right maintains friction pressure between the roll periphery and the friction ring 69 by reason of the angular relationship of the axes of shafts 64 and the relationship of the parts is such that in addition to the pressure of spring 77 an additional pressure, depending on the load carried by the rate changer also operates to force the rolls to the right.

Rotation of the cage 46 of the differential device 38 at different rates determined by rate changer 56 changes the speed of the table drive worm 40 and hence the cutting speed of table 21. Thus when the rate change device 56 is set for zero speed, whereby cage 46 is stationary, and with the differential bevel gears of equal size, as here shown, the worm 40 is driven at the same speed as gear 36 and shaft 37. But assuming that cage 46 is rotated at suitable speed and in proper direction then shaft 39 and worm 40 would not rotate and table 21 would be stationary. In the present instance, however, it is preferred to use other means for stopping the table 21 as will be later described. But it is obvious that any desired maximum table speed may be obtained by suitably proportioning the gearing of the transmission connecting the motor 32 to the table through the differential 38 to effect the desired maximum when the cage 46 is stationary, and that any desired minimum table speed may be obtained by suitably proportioning the transmission connecting the motor 32 to the cage 46 through the rate changer 56 to effect the cage speed required for that minimum table speed at the time when the driven shaft 58 of rate changer 56 is rotating in the proper direction at maximum speed.

In other words the adjustment of rate changer 56 for minimum speed of its output shaft 58 may effect the maximum table speed, the rate changer adjustment for maximum speed of its output shaft 58 may effect the minimum table speed, and any table speed intermediate such maximum and minimum may be obtained by adjusting the control ring of rate changer 56 to a suitable intermediate position.

One of the characteristics of the transmission thus far described is that the drive from motor 32 to output shaft 39 and table 21 is positive, although the rate changes effected by the rate changer 56 are effected by adjustment of elements only frictionally engaged. This is because the rate changer output shaft is connected to the cage 46 of differential 38 through a train which is inherently self-locking. In this instance the self-locking feature is obtained by worm 50 and worm wheel 49. By reason of this construction torque exerted on the cage 46 by motor 32 cannot operate through worm wheel 49 to affect or alter the output speed of the rate changer. Moreover, if the transmission is so arranged, as in the device of Fig. 3, that the worm 50 always tends to rotate the differential cage 46 in the same direction in which the cage is urged by the motor 32, then the only power required to be transmitted through the rate changer 56 is that required to overcome the friction of the train extending from the rate changer drive shaft 57 to the worm 50. In other words the rate changer, in such case, merely unlocks the worm wheel 49 to permit cage 46 to rotate at the speed determined by the rate changer. Under such conditions rate changer 56 may be of very small and compact dimensions as compared with transmissions where the rate changer is required to carry some or all of the transmission load.

The rate changer 56, as here shown includes a differential device, consisting of the co-axial driving gear 61 and driven gear 62 and the gears 63 which connect the driving and driven gears and are carried by the independently rotatable co-axial cage 65. The rotational speed of the cage 65 of such differential device is determined by the adjustment of engaged friction elements consisting of the tapered or conical rolls 66 and the non-rotatable ring 69.

Rate changer 56 may be modified in various ways according to the output characteristics desired. Thus in Fig. 11 there is shown a modified form in which the internal gear 62 of the differential is replaced by a gear 62a, the gears 63 being extended to engage the periphery of gear 62a. This form, or its equivalent, with suitable modification of other parts, may be preferred for various reasons. Generally speaking the result of using a smaller output gear, such as 62a, is to extend the range of the rate changer. With the various other parts proportioned as in Fig. 3 the construction of Fig. 11 would alter the operation of the rate changer by effecting the zero output speed of shaft 58 at approximately the central point in the movement of ring 69, and effecting a considerably larger speed range, but divided between positive or forward speeds and negative or reverse speeds. The result of the reverse speeds would be to drive the output shaft 39 of differential 38 in the same direction as the forward speeds but at a higher speed than obtained when the output shaft 58 of the rate changer is at zero speed, the increase in speed of shaft 39 being in accordance with the value of the negative speed of shaft 58.

It is also to be understood that various other forms of rate changer may be used, and sometimes may be preferred, such for instance as that shown in Patent No. 2,016,248, issued October 1, 1935, in which a friction roller is adjustable to contact a friction disc at different disc diameters, the disc and rollers being suitably connected between shafts 51 and 57. Also any suitable hydraulic rate changer may be used.

Table 21 is reversed, for operation in either direction, and stopped, by suitably controlling the motor 32. In this instance motor 32 is a reversible direct current motor connectible with a line 80, Fig. 9, through a suitable controller, generally indicated by the numeral 81, Fig. 9, which is operated by switch means generally denoted by the numeral 82, Fig. 9. The controller is also diagrammatically indicated in Fig. 10 as will be later explained. A motor direction for left hand movement, Fig. 9, of the table is effected when a movable member 83 of switch 82 engages a switch contact 84, and for a right hand table movement when switch member 83 engages a contact 85, there being an intermediate position of member 83, as shown in Fig. 9 in which motor 32 is stopped.

Figure 9:
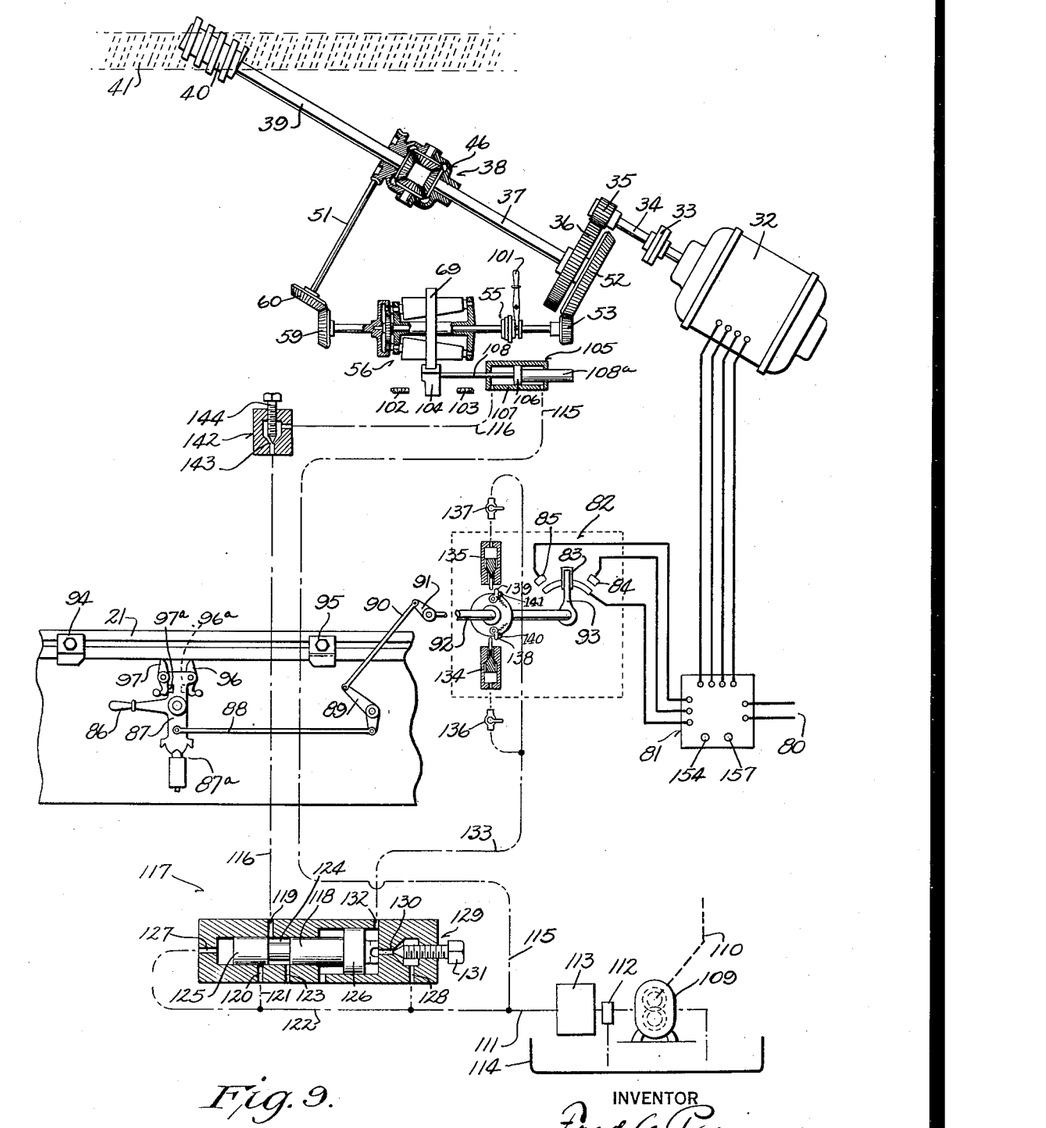
Figure 9 is a diagrammatic development of certain of the transmission and control mechanism of the machine, showing the operating relationship of various parts thereof.

The reversing and stop switch 82 may be manually operated from a hand lever 86, Fig. 9, fixed on a pivoted lever 87, which is connected for movement of the switch member 83 through a connecting rod 88, a pivoted lever 89, a connecting rod 90, a lever 91 fixed on a shaft 92 and a lever 93 also fixed on shaft 92 and carrying the switch member 83.

The reversing switch 82 may also be operated by table dogs, such as 94, 95, Fig. 9, respectively operative in different planes for contact with different trip members 96, 97 in the different directions of table travel, the trip members being each pivoted on the upper end of lever 87 and in different planes corresponding to the planes of the dogs, the members 96, 97 each being prevented from movement relative to lever 87 in one direction by abutments such as 96a, 97a, whereby to move the lever 87, in the one direction of dog movement, but permitting each trip member to pivot in the opposite direction to permit the dog to pass the trip member without movement of the lever 87. A detent cam device 87a of usual construction operates to hold the lever 87 and switch 82 in central position if desired, but effects a quick shift of the parts to effect opposite engagement of switch 82 during shifting out of either engagement by the dogs 94, 95.

In normal operation dogs 94, 95 will cause table 21 to be automatically reversed at each end of a table cycle in which the length of table stroke is determined by the dog spacing, but either trip member 96, 97 may be manually moved about its pivot to avoid the dog, whereby to permit operation of hand lever 86 for effecting a table stop at either end of the table stroke.

Cutting tools such as shown at 23 in Fig. 1, when used in a planer, are intended for cutting only with the table moving in a certain direction, as to the right on Fig. 1. In such case the left hand or non-cutting movement may be much faster. But with other well known forms of machine tools, or with planers as here shown, provided suitable cutting tools are used, the table may be required to operate at a cutting rate in both directions of table movement. In any case, and particularly in planers, the maximum cutting rate may be considerably increased if the tool is permitted to contact the work at a relatively slow rate to avoid shock. Afterwards the rate may be increased to a maximum determined by the nature of the work and cutting tool. Means whereby a cutting rate may be selectively effected in one or both directions, and the cutting rate accelerated following work engagement at either or both ends of the table stroke will now be described.

The rate changer 56 is driven through a clutch device 55, as previously stated. Clutch device 55 includes an inner member 98, Figs. 3, 7, fixed on shaft 54, and an outer member 99 fixed on shaft 57, the inner member having a plurality of cam surfaces such as 98a each provided with spring pressed rollers such as 98b. This construction provides an overrunning clutch device operative for shaft 57, rate changer 56 and differential cage 46 to be driven from motor 32 only in one direction of motor rotation and table travel, which in this instance would be the normal direction for a planer tool such as 23, that is to say to the right in Fig. 1. In the other direction of table travel the rollers 98b will not drive the rate changer and differential cage. If the train connecting the rate changer 56 to the cage 46 is non-reversible, which, as previously explained, may be effected by self-locking characteristics of the worm 50, then in said other direction of table travel the cage 46 will be held stationary, since gear 48 cannot drive worm 50. As previously explained, with rate changer 56 constructed, as shown in Fig. 3, cage 46 is stationary when the table speed is greatest, and the idle or return speed of the table, following the reversal of the driving motor to effect left hand table movement will therefore, when the overrunning clutch is operative, be the maximum speed available from the table drive.

But clutch device 53 is also provided with means locking shaft 57 to rotate with shaft 54, whereby to render the overrunning clutch inoperative in either direction of motor rotation. Thus the outer member 99 is provided with exterior clutch teeth 99a engageable by complimentary clutch teeth on the inner rim of a clutch member 100, which is slidably splined on shaft 54. Clutch member 100 may be shifted to engage with the teeth 99a of member 99 by the means of a hand lever 101, Fig. 1, having an end portion (not shown) suitably engaging an annular groove 100a, Fig. 3, in the clutch member. When the clutch members 98, 100 are engaged the rate changer 56 will control the table rate in each direction, because the worm 50 then drives the differential cage 56 similarly in both directions, and the self-locking characteristics are not effective upon reversal. Table 21 will then operate at a cutting rate controlled by rate changer 56 in both directions of its travel.

As previously explained the rate of the output shaft 58 of rate changer 56 and of the differential cage 46, which determines the speed of table 21 during a cutting stroke, is controlled by the axial adjustment of the non-rotatable ring 69, Fig. 3. Ring 69 may be positioned at any point in its range by suitable adjusting means, in this instance abutment screws 102, 103, adjustable to abut a shifter fork member 104 which engages the ring carrying frame 70. Except as it is desired to accelerate the cutting speed of the table following reversal, as for instance to first contact the work at a slower speed and to then increase the speed to the maximum which the work and tools will stand, as previously mentioned, the abutment members 102, 103 may be adjusted to lock ring 69 in any desired cutting speed position.

But if it is desired to accelerate the speed, as at the start of a cutting stroke, or for similar reasons, the screw 103 is adjusted to the position productive of the desired maximum cutting speed when fork 104 contacts that screw, and the screw 102 is adjusted to the position productive of the desired minimum speed. In other words the abutment screws 102, 103, are spaced apart an amount determined by the difference in the minimum and maximum desired speeds.

Mechanism is provided to shift the speed control ring 69 from the high speed to the slow speed positions upon reversal at either or both ends of table movement, followed by a gradual shifting to return ring 69 to the position of maximum cutting speed, the time required to effect the change from minimum to maximum cutting speed being controlled by manually adjustable means. Such mechanism is as follows:

Shifter fork 104 is shiftable by a piston device 105, Fig. 3, which includes a piston 106, a cylinder 107 and a piston rod 108, upon the end of which shifter fork 104 is fixed, and a larger piston rod 108a extended through the other end of the cylinder. Fluid for operation of piston device 105 is supplied from a pump 109, Fig. 9, preferably driven at constant speed from motor 32 through any suitable transmission line 110, a portion of which is diagrammatically indicated in Fig. 9. Pump 109 supplies a pressure line 111, which should be continuously supplied when the machine is operating, and since the motor 32 is reversible to effect the table reverse, as previously described, the pump 109, when driven from motor 32 is of the type which delivers fluid in the same direction irrespective of the direction of rotation of its drive shaft. Since this result is merely a matter of suitable passages and check valves within the pump casing, and any suitable well known form of pump may be used the pump is not shown in detail. Pump 109 may also be driven at constant speed from a separate uni-direction source such, for instance, as another motor. Between the pump 109 and supply line 111 there is a suitable pressure limiting valve 112 and an accumulator device 113, both of which may be of any well known form. Pump 109 draws fluid from a sump or reservoir 114, Fig. 9, and all waste fluid such as leakage or outflow of fluid from any of the parts connected with the pump is returned to reservoir 114 by suitable channels or conduits (not shown).

The right face of piston 106, Fig. 9, is continuously supplied with pressure fluid directly from the pressure channel 111 through a channel 115 The left face is supplied with fluid through a channel 116 controlled by a valve 117. Valve 117 provides a plunger 118, an outlet port 119 connected to channel 116, an inlet port 119 connected to channel 116, an inlet port 120 connected to supply channel 111 through channels 121, 122 and a drain port 123. In the right hand position of valve plunger 118, as shown in Fig. 9, the channel 116 and port 119 connects the left end of piston 106 of piston drive 105 to the drain port 123 through an annular groove 124 in the plunger and the rate changer speed control ring 69 is then shifted to the left by pressure in channel 115 until shifter fork 104 abuts the screw 102, thereby reducing the speed of table 21, in an amount determined by the adjustment of screw 102. In the left hand position of valve plunger 118 the pressure port 120 is connected through groove 124 to the outlet port 119 and through channel 116 to the left end of piston 106, and in this case since the left end of piston 106 has the largest effective area by reason of the smaller piston rod 108, the piston 106 and speed control ring 69 will move to the right, in a direction to increase the speed of table 21 in an amount determined by the adjustment of screw 103.

The plunger 118 has a smaller piston end 125 and a larger piston end 126, respectively, supplied with pressure fluid from pressure channel 111 through a port 127 and a port 128. Fluid supply to the large piston end 126 passes through a needle valve device 129 in which an opening 130 is controlled by adjustment of a screw 131. From the cylinder portion enclosing the piston end 126 a port 132 and channel 133 connects the cylinder to poppet valves 134, 135 respectively through shut off valves 136, 137, the valves 134, 135 being respectively opened in the opposite directions of movement of reversing switch 82, there being a valve actuating member 137, fixed on the switch shaft 92, which carries pivoted latch dogs or cam elements 138, 139 each spring urged against stops 140 or 141.

Assuming that shut off valves 136, 137 are both open, then in the one direction of movement of shaft 92 and reversing switch 82, the outer end of dog 139 will force the plunger of poppet valve 135 outwardly to open the poppet valve for a period during the switch movement, the poppet valve passing the dog end to permit the valve to close again. While the poppet valve is open the pressure is drained from plunger end 126 of control valve 117, and pressure against the plunger end 125 forces the plunger 118 to the right in Fig. 9, thereby connecting the left end of a piston 106 to the drain 123, whereby the piston 106 and speed control ring 69 moves to the left to reduce the table speed to the point determined by the adjustment of abutment screw 102, as previously described. However, as soon as the poppet valve closes again, which occurs at or about the time the reversing switch reaches its position for effecting the reverse table stroke, then fluid pressure begins to build up against the piston end 126 of plunger 118, fluid passing through the needle valve device 129 at a rate determined by the adjustment of screw 131, and eventually, at a point in the reverse table stroke determined by the needle valve adjustment, the plunger 118 moves to the left again sufficiently to again connect the left end of piston 106 to pressure fluid through the ports 116, 120 of valve 117, whereby to again move piston 106, and speed control ring 69 in the direction to increase the table speed to the point determined by the adjustment of abutment screw 103.

When the switch 82 is next again shifted to reverse the table stroke the poppet valve 135 is not opened during the reverse switch movement, the pivoted latch dog 139 then swinging to pass over the end of the poppet valve plunger without movement of the plunger. But during this reverse movement of the switch the other poppet valve 134 is operated by latch dog 138 in a manner corresponding to that just described for the poppet valve 135, whereby in the table reversal then effected there will be a similar start of opposite table movement at slow rate and a subsequent increase of table speed to the speed determined by the position of abutment screw 103.

Operation of the slow starting and speed increase means requires that the shut off valves 136, 137 be open, since otherwise no fluid can leak through the poppet valves to permit movement of valve plunger 118 to the right. Closing one or the other valve 136, 137 prevents the operation of the speed reducing and accelerating means at the stroke end controlled by the corresponding poppet valve, and since the speed control ring then remains in the position contacting the abutment screw 102 the reverse at that end is then effected at the higher speed determined by screw 102. Thus according to the adjustment of valves 136, 137 the slow start may occur at either or both ends of the table stroke. But it is to be noted that, in any event, when hand lever 101 is in the position rendering effective the overrunning clutch mechanism of clutch device 55, the speed reducing and accelerating mechanism will only be effective at the start of the cutting stroke of the table.

While the mechanism just described will ordinarily be operative for a sufficiently gradual movement of speed control ring from slow to high speed position, and the rate of such movement can ordinarily be sufficiently controlled by adjustment of the needle valve 129, provided that the parts involved are suitably proportioned, yet it is sometimes preferable to supplement the device by the addition of an adjustable needle valve 142, Fig. 9, in the channel 116 leading to the left end, Fig. 9, of piston 106. Needle valve 142 includes an aperture 143 adjustable by a screw 144, through which fluid passes to piston 106. By suitable adjustment of needle valve 142 this valve may supplement the action of needle valve 139 to effect any desired rate of increase of speed following table reversal to effect a cutting stroke.

Figure 10:
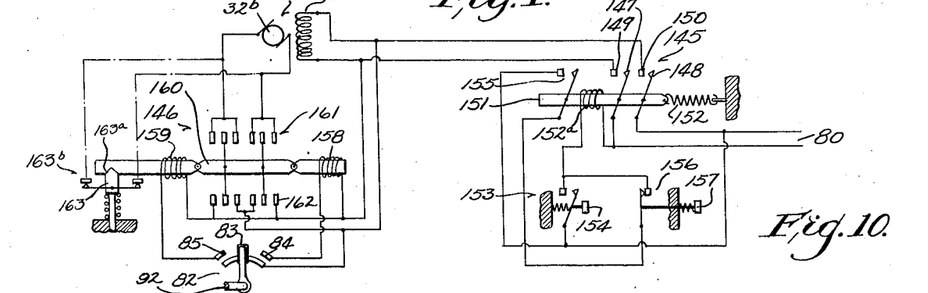
Figure 10 is a diagrammatic development of certain control devices of the machine, particularly for start, stop and reverse of the main driving motor.

The reverser controller 81 and switch 82, Fig. 9, is shown in simplified diagrammatic form in Fig. 10, in which, it will be understood, only certain essential functions are indicated and various supplemental portions, not essential, are not shown. As there shown the main power line 80 is connectible to the field 31a of motor 31 through a stop and run switch 145, and to the rotor 31b of the motor through both the switch 145 and a switch 146.

Switch 145 includes the live contacts 147, 148, which may be shifted to engage the contacts 149, 150, respectively, there being a switch member 151 continuously urged by a spring 152 in a direction to open switch 145, but which may be urged in the other direction, to close switch 145, by means of a solenoid 152a.

Switch 145 is manually controlled to close the switch by means of a normally open switch 153, which may be closed by a push button 154 whereby to complete the circuit of solenoid 152a. The resulting movement of switch member 151 closes a switch 155 and the circuit of solenoid 152a is then closed through switch 155 and a normally closed push button switch 156, following which the push button switch 153 may be released and switch 145 will remain in closed position until such time as a push button 157 is operated to open the switch 156, whereby to interrupt the circuit of solenoid 152 and permit spring 152 to again open switch 145. By the mechanism described the main switch 145 may be closed by manually operating the push button 154 to effect a "run" position and will remain closed until push button 157 is manually operated to effect a "stop" position.

At all times when main switch 145 is in "run" position the machine may be operated and controlled from reversing switch 82 as previously described. The engagement of contacts 84, 85 by the contact 83 of the reversing switch respectively close the circuits of solenoids 158, 159 of switch 146 for shifting a switch member 160 in opposite direction, whereby a series of contacts 161, 162 operate to correspondingly reverse the polarity of the motor rotor 32b relative to the field 32a. When contact 83 is disengaged from both contacts 84, 85 the member 160 is positioned centrally by suitable means such as a spring operated detent device 163 operating on suitable cam surfaces 163a, thereby cutting off line current to rotor 32b to stop the motor. For quickly manually bringing the table to a stop the switch 82 may momentarily be thrown to reversing position, and then brought back to the central position. To assist in bringing the table to a stop, or in slowing down the motor to assist reversal, the motor armature may be short circuited during the intermediate portion of the movement of switch 82, as by a short circuiting switch 163b or other suitable means, which is opened to provide the reversing switch operation previously described whenever switch 82 is in either closed position.

What is claimed is:

1. In a machine tool the combination of relatively movable supports, transmission mechanism for actuation of one of said supports including a differential device, said differential device including a member simultaneously peripherally and bodily rotatable, a rate changer connected for adjustably effecting various rates of said bodily member rotation, reverser means connected for simultaneous reversal of said differential device and rate changer, power means for adjustment of said rate changer, and means controlling said power means in accordance with operation of said reverser means.

2. In a machine tool the combination of relatively movable supports, transmission mechanism for actuation of one of said supports including a differential device, said differential device including a member simultaneously peripherally and bodily rotatable, a rate changer connected for adjustably effecting various rates of said bodily member rotation, reverser means connected for simultaneous reversal of said differential device and rate changer, means for adjustment of said rate changer, means for adjustment of said reverser, and control means selectively operable for substantially simultaneous adjustment of said rate changer and reverser or for independent adjustment of said reverser.

3. In a machine tool the combination of relatively movable supports, transmission mechanism for actuation of one of said supports including a power source and a differential device, said differential device including a member simultaneously peripherally and bodily rotatable, and a rate changer connected to be driven from said source and for adjustably effecting various rates of said bodily member rotation, the connection of said rate changer including an overrunning clutch device for driving the rate changer and means preventing transmission of power from said differential device reversely to said rate changer.

4. In a machine tool the combination of a reciprocatory support, a transmission therefor including a differential device, said differential device including a member simultaneously peripherally and bodily rotatable, a rate changer connected for adjustably effecting various rates of said bodily rotation of the member, the connection of said rate changer including means preventing transmission of power from said differential device reversely to said rate changer, and shiftable reversing means operable for reversal of said differential device, said reversing means effecting disconnection of the drive to said rate changer.

5. In a machine tool the combination of a reciprocatory support, a transmission therefor including a differential device, said differential device including a member simultaneously peripherally and bodily rotatable, a rate changer connected for adjustably effecting various rates of said bodily rotation of the member, the connection of said rate changer including means preventing transmission of power from said differential device reversely to said rate changer, shiftable means operable for reversal of said differential device and substantially simultaneously disconnecting said rate changer, and dog controlled trip means operative in accordance with the reciprocatory movement of said support for shifting said shiftable means.

6. In a machine tool the combination of a reciprocatory support, a transmission therefor including a differential device, said differential device including a member simultaneously peripherally and bodily rotatable, a rate changer connected for adjustably effecting various rates of said bodily rotation of the member, the connection of said rate changer including means preventing transmission of power for said differential device reversely to said rate changer, shiftable reversing means operable for reversing said differential device, and means alternatively adjustable for connecting said rate changer for reversal simultaneously with said device or disconnecting said rate changer during reverse rotation of said device.

7. In a machine tool the combination of relatively movable supports, transmission mechanism for actuation of one of said supports including a differential device, said differential device including a member simultaneously peripherally and bodily rotatable, a rate changer connected for adjustably effecting various rates of said bodily member rotation, means for adjustment of said rate changer, and dog controlled trip means controlling the operation of said adjusting means in accordance with the movement of said support.

8. In a machine tool the combination of relatively movable supports, transmission mechanism for actuation of one of said supports including a differential device, said differential device including a member simultaneously peripherally and bodily rotatable, a rate changer connected for adjustably effecting various rates of said bodily member rotation, reversing means for said transmission, independently operable controller devices respectively for adjustment of said rate changer and for operation of said reversing means, and other control means operable for substantially simultaneous operation of said reversing means and adjustment of said rate changer.

9. In a machine tool the combination of relatively movable supports, transmission mechanism for actuation of one of said supports including a differential device, said differential device including a member simultaneously peripherally and bodily rotatable, a rate changer connected for adjustably effecting various rates of said bodily member rotation, reversing means for said transmission, independently operable controller devices respectively for adjustment of said rate changer and for operation of said reversing means, other control means operable for substantially simultaneous operation of said reversing means and adjustment of said rate changer, and means controlling the rate of adjustment of said rate changer upon operation of said other control means.

10. In a machine tool the combination of relatively movable supports, transmission mechanism for actuation of one of said supports including a differential device, said differential device including a member simultaneously peripherally and bodily rotatable, a rate changer connected for adjustably effecting various rates of said bodily member rotation, reversing means for said transmission, independently operable controller devices respectively for adjustment of said rate changer and for operation of said reversing means, and other means for adjustment of said rate changer including a fluid operable shifter device and valve means controlling the operation of said shift device in accordance with the operation of said reverser device.

11. In a machine tool the combination of relatively movable supports, transmission mechanism for actuation of one of said supports including an adjustable mechanical rate changer and a reversible electric motor, reverser means for said transmission, including a reverser switch device and a reverser controller for said motor operative in accordance with the adjustment of said switch device and means for adjustment of said rate changer in accordance with the operation of said switch device.

12. In a machine tool the combination of relatively movable supports, transmission mechanism for actuation of one of said supports providing a differential device including a member simultaneously peripherally and bodily rotatable, a rate changer connected for adjustably effecting various rates of said bodily member rotation, reverser means connected for simultaneous reversal of said differential device and rate changer, said reverser means including a reversible electric motor, a reverser switch device and a reverser controller for said motor operative in accordance with the adjustment of said switch device, and means for adjustment of said rate changer in accordance with the operation of said switch device.

13. In a machine tool, the combination of relatively movable supports, transmission mechanism for actuation of one of said supports, including a differential device providing a member simultaneously peripherally and bodily rotatable and a rate changer adjustably connected for effecting various rates of said bodily member rotation, the connection of said rate changer and member including means preventing transmission of power from said member reversely through the connection to said rate changer, reverser means for said actuated support, independently operable controller devices respectively for said reverser and for adjustment of said rate changer, and means operable for rendering said rate changer ineffective in one direction of movement of said actuated support.

14. In a machine tool, the combination of relatively movable supports, transmission mechanism for actuation of one of said supports, including a differential device providing a member simultaneously peripherally and bodily rotatable, a rate changer connected for effecting various rates of said bodily member rotation, the connection of said rate changer and member including means preventing transmission of power from said member reversely through said connection, reverser means for said actuated support, independently operable controller devices respectively for said reverser means and for said rate changer, means rendering said rate changer ineffective in one direction of movement of said actuated support, and dog controlled trip means for operation of said reverser controller in accordance with the movement of said actuated support.

15. In a machine tool, the combination of relatively movable supports, transmission mechanism for actuating one of said supports, including a differential device providing a member simultaneously peripherally and bodily rotatable, a rate changer connected for effecting various rates of said bodily member rotation, the connection of said rate changer and member including means preventing transmission of power from said member reversely through said connection, reverser means for said actuated support, independently operable controller devices respectively for said reverser and for said rate changer, dog controlled trip means for operation of said reverser controller in accordance with the movement of said actuated support, and means adjustable for rendering said rate changer ineffective in one direction of support movement, said adjustable means being alternatively adjustable for rendering said rate changer effective in both directions of support movement.

16. In a transmission and control mechanism the combination of a power transmitting differential device including a member having simultaneous bodily and peripheral rotation, another differential device providing an element having simultaneous bodily and peripheral rotation, rate change means controlling the rate of bodily rotation of said element, and a motion transmitting connection from said other differential device for controlling the rate of bodily rotation of said member.

17. In a transmission and control mechanism the combination of a power transmitting differential device including a member having simultaneous bodily and peripheral rotation, another differential device providing an element having simultaneous bodily and peripheral rotation, rate change means controlling the rate of bodily rotation of said element, and a motion transmitting connection from said other differential device for controlling the rate of bodily rotation of said member, said motion transmitting connection including means preventing power transmission from the first mentioned differential device reversely to said other differential device.

18. In a transmission and control mechanism the combination of a power train including a power source, a driving gear, an intermediate gear and a driven gear in series in the order recited, said intermediate gear being bodily rotatable for changing the relative rates of said driving and driven gears, a branch train for determining said relative rates including in the order recited said power source, a driving element, an intermediate element simultaneously bodily and peripherally rotatable, a driven element and a motion transmitting connection from said driven element for bodily rotation of said intermediate gear, said motion transmitting connection being self-locking against transmission of power reversely therethrough, and rate change means adjustably controlling the rate of bodily rotation of said intermediate element.

19. In a transmission and control mechanism, the combination of a main transmission including a pair of bevel gears serially arranged and an intermediate bevel gear simultaneously engaging the gears of said pair and bodily rotatable, and a supplemental transmission including a rate changer, a worm and a worm wheel serially arranged, said worm wheel being connected for said bodily rotation of the intermediate bevel gear; said rate changer including a conically tapered roller bodily rotatable on an axis offset from the axis of its cone and a ring member coaxial with said offset axis and internally engaging said roller, said roller and ring member being relatively adjustable axially of said offset axis.

20. In a machine tool the combination of relatively movable supports, transmission mechanism for movement of one of said supports including a shiftable rate changer and shiftable reversing means, power means for shifting said rate changer, control means for said power means operable to effect a gradual increase of rate to a predetermined maximum rate following a shifting of said reversing means, and means adjustably controlling the period of said increase of rate.

21. In a machine tool the combination of relatively movable supports, transmission mechanism for movement of one of said supports including a shiftable rate changer and shiftable reversing means, power means for shifting said rate changer, and control means for said power means operable to effect an abrupt reduction of rate substantially simultaneously with shifting of said reversing means and a gradual increase of rate to a predetermined maximum rate following said shifting.

22. In a machine tool the combination of relatively movable supports, transmission mechanism for movement of one of said supports including a shiftable rate changer and shiftable reversing means, power means for shifting said rate changer, control means for said power means operable to effect an abrupt reduction of rate substantially simultaneously with shifting of said reversing means and a gradual increase of rate to a predetermined maximum rate following said shifting, and means adjustably controlling the period of said increase of rate.

23. In a transmission and control mechanism the combination of transmission mechanism including a rate changer comprising rate change elements frictionally engaged and relatively adjustable to different positions respectively effecting relatively low and high speeds, said elements being relatively adjustable to any position intermediate said different positions whereby to effect any intermediate speed, rate changer control means adjustably determinative of one of said speeds, power operable shifting means for relative adjustment of said elements to a position determined by said rate changer control means, and means preventing an abrupt shifting of said rate changer elements.

24. In a transmission and control mechanism the combination of transmission mechanism including a rate changer comprising rate change elements frictionally engaged and relatively adjustable to different positions respectively effecting relatively low and high speeds, said elements being relatively adjustable to any position intermediate said different positions whereby to effect any intermediate speed, rate changer control means adjustably determinative of one of said speeds, power operable shifting means for relative adjustment of said elements to a position determined by said rate changer control means, means preventing an abrupt shifting of said rate changer elements, and means controlled by said transmission for initiating the operation of said shifting means.

25. In a transmission and control mechanism the combination of transmission mechanism including a rate changer comprising rate change elements frictionally engaged and relatively adjustable to different positions respectively effecting relatively low and high speeds, said elements being relatively adjustable to any position intermediate said different positions whereby to effect any intermediate speed, rate changer control means adjustably determinative of one of said speeds, power operable shifting means for relative adjustment of said elements to a position determined by said rate changer control means, and means preventing an abrupt shifting of said rate change elements.

26. In a transmission and control mechanism the combination of a rate changer comprising a rotary carrier, a plurality of tapered relatively inclined planetary rollers rotatable with and with respect to said carrier, a non-rotating rate control ring encircling and frictionally contacting said rollers and axially shiftable to change the speed of the rollers, and control means for said rate changer including power means for said axial shifting of the control ring and means regulating the rate at which said power means may shift the control ring.

27. In a transmission and control mechanism the combination of a rate changer comprising a rotary carrier, a plurality of tapered relatively inclined planetary rollers rotatable with and with respect to said carrier, a non-rotating rate control ring encircling and frictionally contacting said rollers and axially shiftable to change the speed of the rollers, and control means for said rate changer including power means for shifting said control ring in either axial direction and means controlling the rate of operation of said power means during shifting of said ring in at least one of said directions.

28. In a transmission and control mechanism the combination of a rate changer comprising a rotary carrier, a plurality of tapered relatively inclined planetary rollers rotatable with and with respect to said carrier, a non-rotating rate control ring encircling and frictionally contacting said rollers and axially shiftable to change the speed of the rollers, and control means for said rate changer including fluid operable means for shifting said control ring, a pressure fluid source connectible therewith, and means controlling the rate of pressure fluid flow from said source to said shifting means to prevent abrupt shifting of said ring.

29. In a transmission and control mechanism the combination of a rate changer comprising a rotary carrier, a plurality of tapered relatively inclined planetary rollers rotatable with and with respect to said carrier, a non-rotating rate control ring encircling and frictionally contacting said rollers and axially shiftable to change the speed of the rollers, and control means for said rate changer including power means for said axial shifting of the control ring and means adjustably determinative of different rates of said axial shifting.

FRED A. PARSONS.

CERTIFICATE OF CORRECTION.

Patent No. 2,202,263. May 28, 1940.

FRED A. PARSONS.

It is hereby certified that error appears in the printed specification of the above numbered patent requiring correction as follows: Page 5, first column, line 11, after "115" insert a period; line 24, before "pressure" insert --the--; line 39, after the word "respectively" strike out the comma; same page, second column, line 61, for the reference numeral "139" read --129--; page 6, second column, line 57, claim 6, for the word "for" read --from--; page 7, first column, line 46, claim 10, for "shift" read --shifter--; line 61, claim 12, for "providing" read --including--; line 62, same claim, for "including" read --providing--; same page, second column, line 36, claim 15, for the word "actuating" read --actuation of--; and that the said Letters Patent should be read with this correction therein that the same may conform to the record of the case in the Patent Office.

Signed and sealed this 24th day of September, A. D. 1940.

(Seal)

Henry Van Arsdale,
Acting Commissioner of Patents.